Feb. 18, 1969  W. W. BUTCHER  3,427,808
LIQUID CONTAINER PRESSURIZATION BY NON-ELECTROLYTIC
DISSOCIATION OF CONTAINER CONTENTS
Filed Sept. 1, 1966

INVENTOR.
WALTER W. BUTCHER,
BY
Thomas R. Boston
ATTORNEY.

United States Patent Office 3,427,808
Patented Feb. 18, 1969

3,427,808
LIQUID CONTAINER PRESSURIZATION BY NON-ELECTROLYTIC DISSOCIATION OF CONTAINER CONTENTS
Walter W. Butcher, Santa Monica, Calif., assignor to Hughes Aircraft Company, Culver City, Calif., a corporation of Delaware
Filed Sept. 1, 1966, Ser. No. 576,744
U.S. Cl. 60—204                                    14 Claims
Int. Cl. F02k 9/02; B64g 9/00

ABSTRACT OF THE DISCLOSURE

Liquid container contents are pressurized by dissociating container contents by other than electrolytic means. When liquid container contents are selected from a suitable group, dissociation of the container contents can be accomplished by heating, solar radiation or energetic radiation and results in gaseous products. This dissociation from the liquid to the gaseous state increases the volume of material in the container, and pressurizes the container to expel the liquid container contents.

---

This invention relates generally to satellite propulsion systems using pressurized gas and more particularly to satellite propulsion systems including methods and apparatus for generating said pressurized gas.

Small reaction control propulsion systems are required on spacecraft and satellites for such purposes as station acquisition, attitude control and station keeping. In such propulsion systems the propellant may be either a liquid or a gas. In both cases pressurized gas is employed for pumping the propellant to the engine. Known liquid propellant systems employ a separate pressurized gas tank in communication with the liquid propellant and also often require gas pressure control means for maintaining proper pressure in the propellant system. Such prepressurized gas and liquid systems for propellant feed, in addition to the disadvantage of requiring high pressure gas storage, were subject to leakage of the pressurizing gas.

It is therefore a primary object of the present invention to provide a satellite propulsion system which employs pressurized gas with means for generating its own pressurized gas.

It is another object of the invention to provide a method and apparatus for generating pressurizing gas for use in a satellite propulsion system.

It is a further object of the invention to provide a pressurized gas, satellite propulsion system which does not require a high pressure, prepressurized system, and which therefore overcomes the disadvantages inherent therein.

These objects are accomplished according to the present invention by providing a quantity of solid or liquid material which is decomposible into the gas state and by selectively decomposing said material into gas. A large number of decomposible materials are applicable for use in the present invention, such as hydrazine, compounds of hydrazine, hydrogen peroxide, ammonia, nitrogen oxides, Hybaline A or B, aluminum hydride, beryllium hydride, decaborane, diborane, dicyanoethylene lithium hydride, magnesium hydride, pentaborane, hydrocarbons, ammonium perchlorate, nitronium perchlorate, perchloryl fluoride, nitric acid and tetranitromethane. The three preferred systems according to the present invention for decomposing such materials into gas employ thermal decomposition, photolysis and radiolysis. In one application of the invention the decomposible material (in this case liquid) is the propellant, in which case the pressurized gas produced therefrom is used to pump or feed the liquid propellant to the engine. In another application the gas produced from the decomposible material is the propellant in which case it is pumped or fed by its own pressure into a suitable engine. The invention is also applicable for providing pressurizing gas for use as the feeding or pumping means where the decomposible material is not used as the propellant. Any of the three decomposition methods, i.e., thermal, photolysis, and radiolysis, can be used in any of the above-mentioned three applications of the invention.

These and other objects and advantages of the present invention will be more fully understood by reference to the following detailed description when read in conjunction with the attached drawing.

Description

Figure 1:
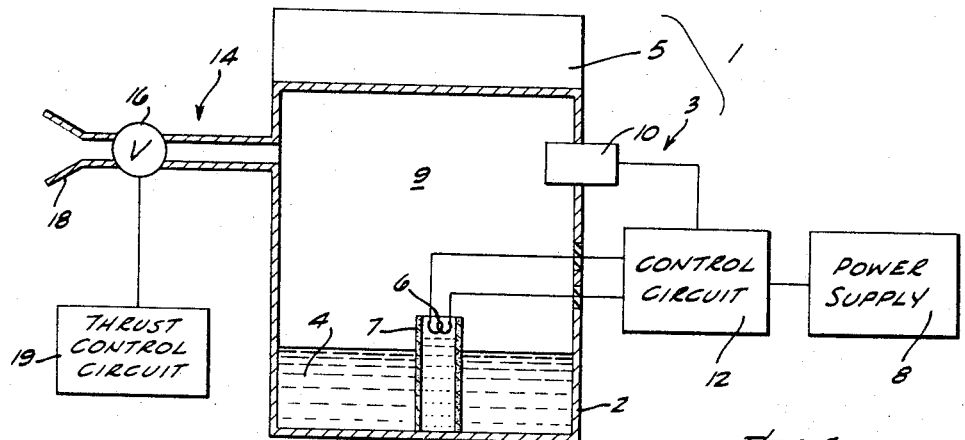
FIG. 1 is a cross-sectional, partly schematic view of the thermal decomposition embodiment of the invention combined with that application in which the generated gas is used as the propellant.

FIG. 1 illustrates schematically a spacecraft 1 which includes as a part thereof a pressurizing gas production system 3 according to a preferred embodiment of the present invention. The remaining portion 5 of the spacecraft 1 is shown in block form as it forms no part of the present invention. The system 3 employs the thermal decomposition embodiment of the invention as applied to a system using the generated gas as the propellant. FIG. 1 shows a tank 2 which contains a quantity of decomposible material 4 and which is capable of containing the gas generated therefrom under pressure in the portion 9 of the tank 2. In this embodiment the decomposible material is decomposed by heat, by means, for example, of an electrically heated filament 6 mounted within the tank 2. In the embodiment shown the material 4 is hydrazine and it is preferred that the filament 6 be positioned for operation in the vapor phase. For such operation a wick 7 is provided to supply hydrazine to the region of the filament 6. The filament 6 is heated by an electric current supplied by a power supply 8. The application of power to the filament 6 is controlled by a control circuit 12. The gas pressure in the tank 2 is maintained at a substantially constant level by means of a pressure transducer 10 which is suitably mounted in a wall of the tank 2 and which is connected to the control circuit 12. When the pressure in the tank 2 falls below a predetermined level, the control circuit 12 responds to the resultant electrical signal from the pressure transducer 10 by closing the circuit between the power supply 8 and the filament 6. Gas will then be generated by thermal decomposition until the gas pressure in the tank 2 rises to a certain predetermined value at which the resultant electrical signal from the transducer 10 to the circuit 12 will cause the power supply 8 to be disconnected from the filament 6. A gas feed line 14 is provided for connecting the tank 2 to, for example, a gas discharge nozzle 18 of the spacecraft. A valve 16 in the feed line 14 is opened and closed by a control circuit 19 to provide controlled thrust for the spacecraft. The operation of circuit 19 and valve 16, for example, for station keeping purposes, forms no part of this invention, is well-known to those skilled in the art, and need not be described in detail here.

Various modifications can be made in the system described above as will be obvious to one skilled in the art. For example, the means for providing heat to the material 4 need not be an electrically heated filament nor disposed within the vapor phase nor within the tank. Further, the generated gas can be transferred to and contained in a separate tank upon production thereof. The electrical circuitry can be very simple, for example, the pressure transducer and the control circuit can be a simple pressure switch for controlling the application of power to the filament 6. A safety valve can be installed to allow gas to be expelled from the tank 2 should the pressure exceed the desired level for any reason. The spacecraft 1 can be provided (e.g. by spinning) with its own gravity system. Otherwise various known means, such as baffles, membranes, screens, etc., can be provided to keep the gas phase separate from the liquid phase.

A practical example of the above embodiment was carried out as follows. A quantity of hydrazine was placed in small bomb-type apparatus incorporating an electrically heated nichrome wire filament in the hydrazine. When the filament was heated to 1165° F., the pressure in the bomb rose from −11.2 p.s.i.g. to 55.7 p.s.i.g. in one minute and 47 seconds.

Figure 2:
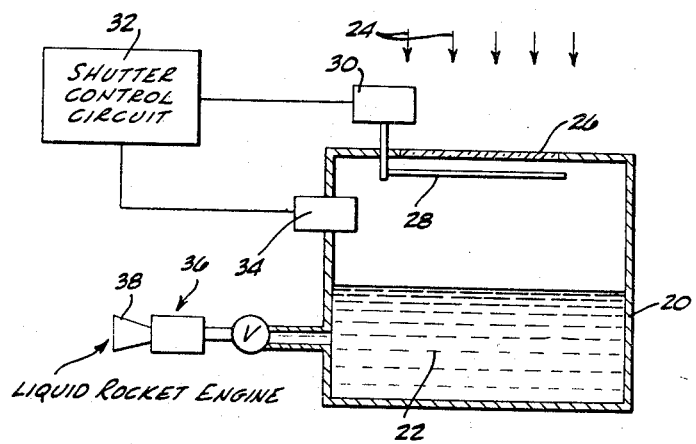
FIG. 2 is a cross-sectional, partly schematic view of the photolytic decomposition embodiment of the invention combined with that application in which the decomposible material is used as the propellant.

FIG. 2 illustrates the photolytic decomposition embodiment of the present invention combined with that application in which the decomposible material is used as the propellant. FIG. 2 shows a tank 20 containing a quantity of decomposible material 22. The material 22 is decomposed upon exposure to radiation (indicated by arrows 24) having a wavelength which is absorbed by the material 22. In a satellite, the material 22 in the tank 20 is irradiated by solar radiation 24 entering through a window 26, which may be made out of quartz, for example. The radiation 24 is selectively admitted by opening and closing a shutter 28 (which can be inside or outside the tank 20). Any conventional shutter mechanism can be used. The operation of the shutter 28 is controlled by a shutter actuating means 30 (such as a motor) which means 30 is in turn controlled by a control circuit 32 in response to electrical input signals from a pressure transducer 34 mounted in the tank 20. A valved liquid feed line 36 is provided for transporting (by means of the pressure of the generated gas) the liquid decomposible material 22 to a liquid rocket engine 38 for use as the propellant.

A practical example of this embodiment of the invention was carried out as follows. Hydrazine was placed in a small bomb having a quartz window and the hydrazine was irradiated through the window by the light from a 500 watt mercury lamp. Sunlight could not be used for this experiment because the earth's atmosphere filters out most of the short ultraviolet radiation, which radiation is preferred for photolytic decomposition of hydrazine. In a period of approximately 2½ days a pressure rise of 100 p.s.i.g. was observed, with rates as high as 2 p.s.i.g. per hour being obtained.

Figure 3:
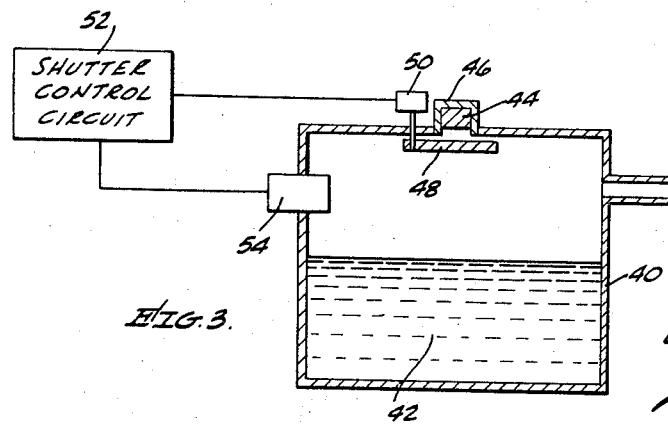
FIG. 3 is a cross-sectional, partly schematic view of the radiolytic decomposition embodiment of the invention combined with that application in which the generated gas is used to pressurize a separate liquid propellant system.

FIG. 3 illustrates the radiolytic decomposition embodiment of the present invention combined with that application in which the generated gas is used to pressurize a separate liquid propellant system. FIG. 3 shows a pressure tank 40 containing a quantity of decomposible material 42. In this embodiment the material 42 is one which is decomposed when irradiated with energetic radiation such as X-rays, gamma rays, cosmic rays, neutrons, etc. A radiation source 44 is mounted within the tank 40 in a shield 46 and is provided with a shielded shutter means 48. The shutter 48 is opened and closed by a shutter actuating means 50 to control the irradiation of the material 42 by the source 44. The operation of the means 50 is controlled by a control circuit 52 in response to input signals from a pressure transducer 54. A valved gas feed line 56 is provided to pressurize the separate liquid propellant system 58. The system 58 comprises a liquid rocket engine 60, a propellant tank 62, and a bladder 64 which contains the pressurizing gas. The valve in feed line 56 can be omitted; it can also be a plural channel valve connected to several different propulsion units.

Various materials which decompose when irradiated with energetic radiation can be employed in this embodiment of the invention. One example of the material 42 is hydrazine while the source 44 can be an alpha particle source such as polonium.

The pressurized gas produced according to the present invention can be used as the propellant in the manner of the "cold gas technique." However, several different gas compositions can be produced by this invention, in one or more tanks and then combined to produce a gas which can be ignited in the nozzle of a spacecraft propulsion system. Further, the gas produced by the invention can be used for purposes other than propulsion. It has application in any device wherein the use of pressurized gas is required. This invention is particularly useful during long, unattended operations in a space environment, whether in a satellite or other spacecraft. Instead of controlling the decomposition in response to pressure, the decomposition can be carried out for certain time intervals. Since the amount of gas used up in a certain time of use can be predetermined, control can be had by measuring time of use rather than pressure.

What is claimed is:

1. A material dispensing system comprising:
   container means having a dispensing outlet, a liquid material in said container, said liquid material being decomposible into at least one gaseous product by non-electrolytic means;
   non-electrolytic decomposing means associated with said container for decomposing said liquid material to produce at least one gaseous product for pressurizing said container;
   outlet means on said container for dispensing said liquid material from said container; and
   control means associated with said decomposing means for controlling the decomposition of said liquid material.

2. The pressurizing gas production system of claim 1 wherein said liquid material is selected from the group consisting of hydrazine, hydrazine compounds, hydrogen peroxide, ammonia, nitrogen oxides, decaborane, diborane, pentaborane, hydrocarbans, perchloryl fluoride, nitric acid and tetranitromethane.

3. The pressurizing gas production system of claim 2 wherein said decomposing means comprises thermo-decomposing means which is adapted to be raised to a temperature at which the material is dissociated into the gaseous state.

4. The pressurizing gas production system of claim 2 wherein said decomposing means comprises solar radiation admitting means for decomposing said material into the gaseous state.

5. The pressurizing gas production system of claim 2 wherein said decomposing means comprises energetic radiation means associated with said container to decompose said material into the gaseous state.

6. The pressurizing gas production system of claim 1 wherein said decomposing means comprises thermo-decomposing means which is adapted to be raised to a temperature at which the material is dissociated into the gaseous state.

7. The pressurizing gas production system of claim 1 wherein said decomposing means comprises solar radiation admitting means for decomposing said material into the gaseous state.

8. The pressurizing gas production system of claim 1 wherein said decomposing means comprises energetic radiation means associated with said container to decompose said material into the gaseous state.

9. The pressurizing gas production system of claim 1 wherein said control means comprises a shutter movably positionable from a position where it prevents said dissociation means from decomposing said material into products of the gaseous state to a position where it permits said decomposing means to decompose said material into gaseous products.

10. The pressurizing gas production system of claim 9 wherein said decomposing means comprises radiant energy means and said shutter is positionable between said radiant energy means and said material.

11. The pressurizing gas production system of claim 10 wherein said radiant energy means comprises solar radiant energy admitting means.

12. The device of claim 1 wherein said liquid material is a propellant and said outlet means from said container includes a reaction engine.

13. The process of dispensing material from a container comprising the steps of:
at least partially filling the container with a liquid material which is decomposible into products having an increased volume by decomposition means other than electrolytic decomposition means;
non-electrolytically decomposing a portion of said liquid material into products having a greater volume than said liquid material so as to increase the pressure in said container;
controlling the decomposition step so as to control the pressure in said container; and
dispensing at least some of said liquid material from said container under the pressure produced by decomposition of said material into products having a greater volume.

14. The process of claim 13 wherein said dispensing step includes dispensing said liquid material to a reaction engine.

References Cited
UNITED STATES PATENTS

| | | | |
|---|---|---|---|
| 2,098,629 | 11/1937 | Knowlton. | |
| 2,259,902 | 10/1941 | McCain | 126—271 |
| 2,519,515 | 8/1950 | Turner | 219—274 |
| 2,546,210 | 3/1951 | Bittner | 60—203 |
| 2,586,839 | 2/1952 | Mapes. | |
| 2,617,010 | 11/1952 | Schmitz | 219—274 |
| 2,671,312 | 3/1954 | Roy | 60—259 XR |
| 2,701,441 | 2/1955 | Mitchell | 60—39.48 XR |
| 2,728,191 | 12/1955 | Casey | 60—227 XR |
| 2,785,272 | 3/1957 | Baly | 219—332 XR |
| 2,816,419 | 12/1957 | Mueller | 60—39.48 XR |
| 2,964,916 | 12/1960 | Keeping. | |
| 3,083,528 | 4/1963 | Brown | 60—203 |
| 3,097,480 | 7/1963 | Sohn | 60—203 |
| 3,159,967 | 12/1964 | Webb | 60—202 |
| 3,262,872 | 7/1966 | Rhodes et al. | |
| 3,273,558 | 9/1966 | Boothe | 126—271 |
| 3,280,568 | 10/1966 | Friedman et al. | 60—203 |
| 3,315,471 | 4/1967 | Dailey et al. | 60—203 |
| 3,320,742 | 5/1967 | Truax | 60—39.48 |

CARLTON R. CROYLE, *Primary Examiner.*

U.S. Cl. X.R.

103—6; 222—189; 60—39.48, 203, 221, 259; 126—270